(12) United States Patent
Dickerson

(10) Patent No.: US 10,076,679 B2
(45) Date of Patent: Sep. 18, 2018

(54) WEIGHTLIFTING PLATES

(71) Applicant: Mercedes L. Dickerson, Hayward, CA (US)

(72) Inventor: Mercedes L. Dickerson, Hayward, CA (US)

( * ) Notice: Subject to any disclaimer, the term of this patent is extended or adjusted under 35 U.S.C. 154(b) by 22 days.

(21) Appl. No.: 14/857,721

(22) Filed: Sep. 17, 2015

(65) Prior Publication Data

US 2017/0080274 A1 Mar. 23, 2017

(51) Int. Cl.
*A63B 21/072* (2006.01)
*A63B 21/075* (2006.01)
*A63B 21/00* (2006.01)
*A63B 23/12* (2006.01)
*A63B 21/06* (2006.01)

(52) U.S. Cl.
CPC ........ *A63B 21/075* (2013.01); *A63B 21/4035* (2015.10); *A63B 21/4043* (2015.10); *A63B 23/12* (2013.01); *A63B 21/0607* (2013.01); *A63B 21/0724* (2013.01); *A63B 2209/00* (2013.01); *C08J 2375/04* (2013.01)

(58) Field of Classification Search
CPC ..... A63B 21/00; A63B 21/06; A63B 21/0601; A63B 21/0604; A63B 21/0607; A63B 21/0615; A63B 21/072; A63B 21/0724; A63B 21/0728; A63B 21/075; A63B 23/12; A63B 2209/00; A63B 2209/02; A63B 2209/023; A63B 2209/026; A63B 2209/14
USPC ................ 482/106, 107, 108, 109
See application file for complete search history.

(56) References Cited

U.S. PATENT DOCUMENTS

| | | | | |
|---|---|---|---|---|
| 3,463,486 A | * | 8/1969 | James, Jr. .......... | A63B 21/0604 482/106 |
| 4,484,740 A | * | 11/1984 | Green .............. | A63B 23/03508 482/105 |
| 4,566,690 A | | 1/1986 | Schook | |
| 4,955,603 A | * | 9/1990 | Becker .............. | A63B 21/0728 403/259 |
| 5,203,753 A | * | 4/1993 | Rothhammer ....... | A63B 21/072 411/55 |
| 5,407,413 A | * | 4/1995 | Kupferman ........ | A63B 21/0728 482/106 |
| 5,853,355 A | * | 12/1998 | Standish ............ | A63B 21/0601 482/106 |
| 6,005,041 A | * | 12/1999 | Cook ..................... | A63B 21/06 524/435 |

(Continued)

FOREIGN PATENT DOCUMENTS

GB 2437259 A 10/2007

OTHER PUBLICATIONS

International Search Report and Written Opinion dated Jan. 27, 2017 in International Patent Application No. PCT/US2016/052155, 11 pages.

*Primary Examiner* — Joshua Lee
(74) *Attorney, Agent, or Firm* — Shook, Hardy & Bacon L.L.P.

(57) ABSTRACT

Weightlifting plates might be constructed of various materials. For example, a density-adjustable composition might be used that allows respective weight amounts plates to differ, while the plate volumes remain consistent. As such, in a set of weightlifting plates, each plate in the set includes a common volume (e.g., diameter and thickness) and a different respective weight amount. In addition, the weight plates can be combined with a barbell.

9 Claims, 3 Drawing Sheets

(56) References Cited

U.S. PATENT DOCUMENTS

| | | | |
|---|---|---|---|
| 6,436,015 B1 * | 8/2002 | Frasco | A63B 21/072 482/106 |
| 6,991,590 B2 | 1/2006 | Vigiano | |
| 2005/0281999 A1 * | 12/2005 | Hofmann | B32B 5/18 428/304.4 |
| 2007/0184943 A1 * | 8/2007 | Davies | A63B 21/0724 482/93 |
| 2007/0197352 A1 * | 8/2007 | Charniga | A63B 21/06 482/93 |
| 2009/0050768 A1 * | 2/2009 | Campbell | A63B 21/0728 248/346.01 |
| 2010/0022359 A1 * | 1/2010 | Lin | A63B 21/0601 482/93 |
| 2010/0165166 A1 | 7/2010 | Hara et al. | |
| 2012/0258846 A1 * | 10/2012 | Wilson | A63B 21/0004 482/141 |
| 2012/0302409 A1 * | 11/2012 | Mikulski | A63B 21/0603 482/93 |

* cited by examiner

WEIGHTLIFTING PLATES

BRIEF SUMMARY

In brief, and at a high level, this disclosure describes, among other things, a weightlifting plate constructed of a density-adjustable composition. In addition, this disclosure describes a set of weightlifting plates in which each plate in the set includes a common volume (e.g., diameter and thickness) and a different respective weight amount. This high-level overview is provided to introduce a selection of concepts that are further described below in the detailed-description section. This summary is not intended to identify key features or essential features of the claimed subject matter, nor is it intended to be used as an aid in isolation to determine the scope of the claimed subject matter.

BRIEF DESCRIPTION OF THE DRAWINGS

The present invention is described in detail herein with reference to the attached figures, which are incorporated herein by reference, wherein.

DETAILED DESCRIPTION

The subject matter of aspects of the present invention is described with specificity herein to meet statutory requirements. But the description itself is not intended to necessarily limit the scope of claims. Rather, the claimed subject matter might be embodied or carried out in other ways to include different elements or combinations of elements similar to the ones described in this document, in conjunction with other present or future technologies.

Aspects of this application include technology related to a weightlifting plate and to a system of weightlifting plates. More specifically, this technology includes weightlifting plates that are constructed of a density-adjustable composition, which allows a total weight amount of each plate to be adjusted to a desired weight without changing a volume of the plates. That is, two or more plates can have the same three-dimensional volume (e.g., diameter and thickness) and have different respective weight amounts.

Figure 1:
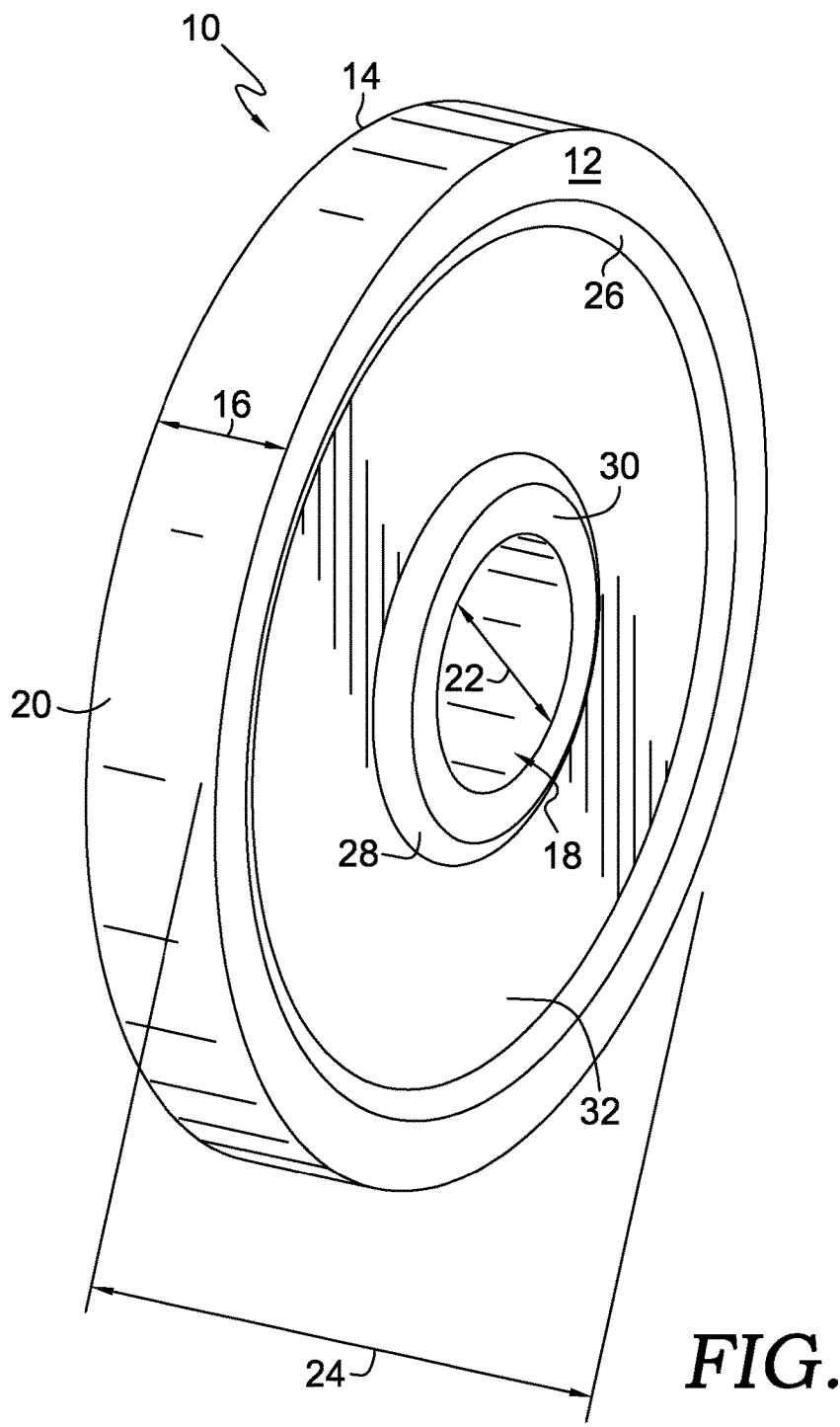
FIG. 1 depicts a weightlifting plate in accordance with an aspect hereof.

Referring now to FIG. 1, an exemplary weightlifting plate 10 is depicted, which includes a disc-shaped body. Generally, the plate 10 includes a first surface 12 and a second surface 14, which is obstructed from view in FIG. 1. In addition, the plate 10 includes a plate thickness (e.g., thickness 16 around the periphery) that extends between the first surface 12 and the second surface 14. The plate 10 also includes a central bore 18 extending entirely though the plate thickness and includes a circular periphery edge 20. The central bore 18 and the periphery edge 20 each include a diameter 22 and 24, respectively.

The plate 10 might include a consistent thickness throughout the plate. In an alternative aspect shown in the various figures, the same plate 10 can include various thicknesses as the disc-shaped body extends from the central bore 18 to the circular periphery edge 20. For example, in FIG. 1 the first surface 12 and the second surface 14 include one or more shoulders 26 and 28. Among other things, the first shoulder 26 can provide a lip that assists with carrying the plate 10. In addition, the first shoulder 26 can be used to transition to a thicker plate rim around the periphery edge of the plate 10, which can enhance the stability of the plate 10 when the plate is loaded on a barbell (such as in FIG. 3) by providing greater surface contact with the ground. Similarly, the second shoulder 28 can transition to a thicker central hub 30 that circumscribes the central bore 18 and can also provide enhanced stability when the plate 10 is loaded on a barbell by providing greater surface contact with the barbell. The term "thicker" is relative when describing the edge 20 and the central hub 30 and is relative to a more central portion 32 of the disc body that is between the edge 20 and the hub 30.

In an aspect of the present invention, the plate 10 is constructed of a density-adjustable composition. For example, a desired density of the composition might be achieved by adding a foaming agent or other substance to a liquid-state material, which hardens to create a cellular structure. That is, an amount of a foaming agent is added to the material in a liquid state, which is then distributed into a plate-shaped mold and hardened. In one aspect, the material includes a semi-flex urethane foam to which a blowing agent has been added to achieve a desired density.

Figure 2:
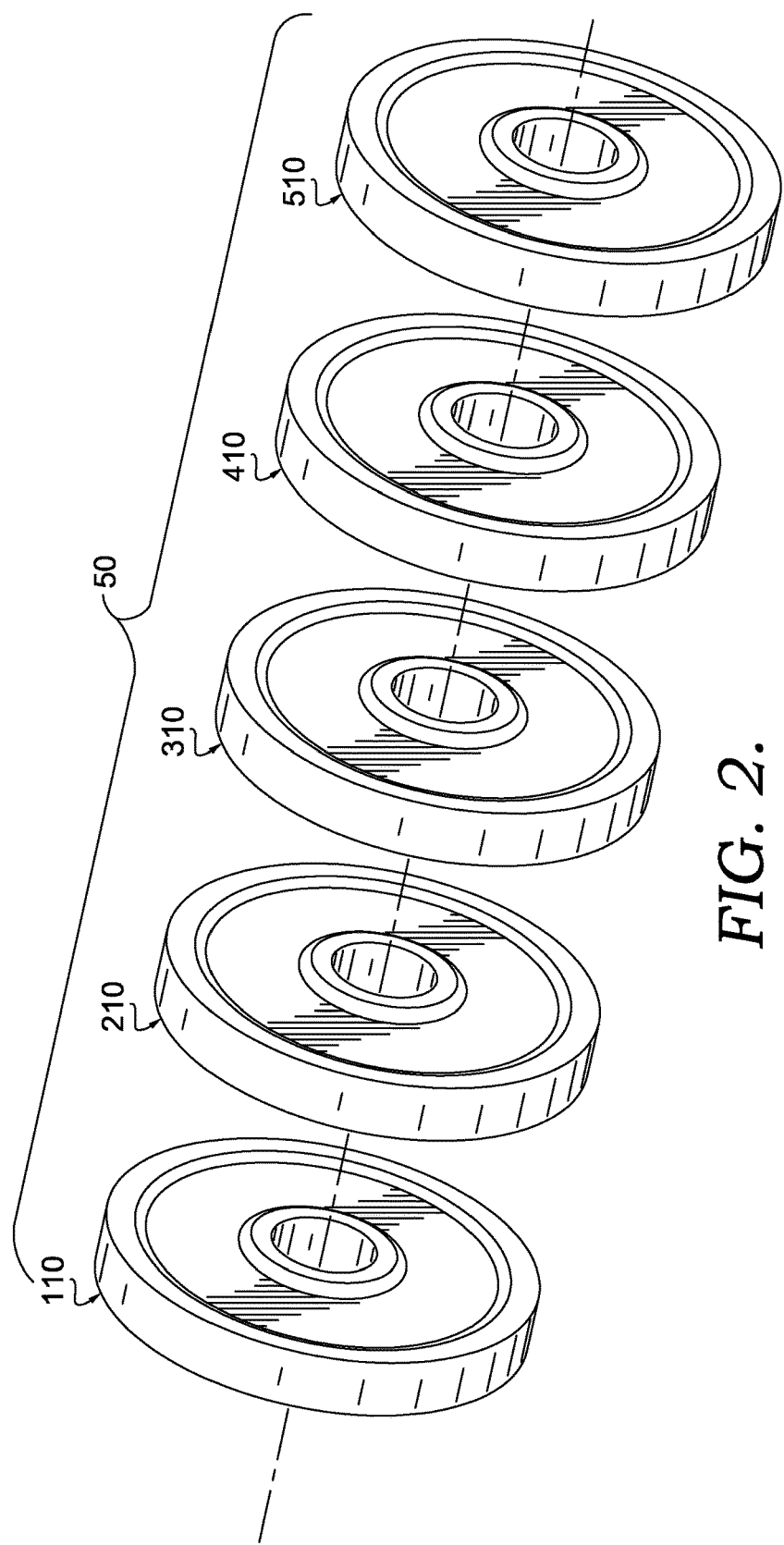
FIG. 2 depicts a set of weightlifting plates in accordance with an aspect hereof.

In a further aspect of the present invention, by using a density-adjustable composition, a set of two or more weight plates are provided that include a same three-dimensional volume and different respective weight amounts. For example, referring to FIG. 2, an exemplary set of weight plates 50 is depicted that includes a first plate 110, a second plate 210, a third plate 310, a fourth plate 410, and a fifth plate 510. In accordance with an aspect of the present invention, each of the plates 110, 210, 310, 410, and 510 is constructed of a density-adjustable composition having a respective amount or concentration of a blowing agent in order to achieve a particular density, which can achieve a desired weight amount for the common volume. In FIG. 2, five plates are depicted for exemplary purposes, but in other aspects of the current invention, a set of weight plates might include any number of plates having different weight amounts. In addition, a set of plates can include one or more pairs of plates that include a common size (i.e., diameter and thickness) and weight amount, each plate in a pair being loadable on opposite sides of a barbell or weightlifting apparatus. In a further aspect, a set of weight plates might include any number of plates greater than or equal to two plates and less than or equal to five plates.

In a further aspect of the present invention, the set of plates 50 includes weight amounts that range from about 0.5 kg to about 10 kg and includes a common three-dimensional volume. For example, plate 110 might include 0.5 kg; plate 210 might include 1.0 kg; plate 310 might include 1.5 kg; plate 410 might include 2.0 kg; and plate 510 might include 2.5 kg, each of the plates 110-510 including a common diameter and thickness. In another example, plate 110 might include 2.5 kg; plate 210 might include 5.0 kg; plate 310 might include 7.5 kg; and plate 410 might include 10.0 kg, each of the plates 110-410 including a common diameter and thickness. As previously described, the concentration of foaming agent is adjusted for each plate in order to achieve a density that will yield a desired weight amount.

Each of the plates depicted in FIG. 2 includes structural features similar to the elements described in FIG. 1 for the plate 10. For example, each of the plates in FIG. 2 includes a first surface and an opposing second surface, and a plate thickness extending between the first surface and the opposing second surface. In addition, each of the plates includes a central bore extending entirely through the plate thickness and having a hole diameter, as well as a circular periphery edge forming a plate diameter. As previously indicated, each plate in the set of two or more plates shares a common plate thickness, a common plate diameter, and a common hole diameter, which provides a common three-dimensional volume.

In a further aspect of the present invention, each plate in the set 50 includes a plate diameter that is in a range of about 17.75 cm to about 25.4 cm. For instance, each plate might include a diameter of about 22.7 cm. Although other diameters less than or greater than this range are contemplated in other aspects. In another aspect, each plate in the set 50 includes a plate thickness near the periphery edge and near the central hub of about 2.5 cm to about 5 cm. For instance, each plate might include a diameter of about 3.35 cm. But other thicknesses that are less than or greater than this range are contemplated in other aspects. In addition, each plate includes a hole diameter of about 5 cm, which is useful for adding the plates to an Olympic-style weightlifting barbell having sleeves with a 4.9 cm diameter. As such, in one aspect, each plate in the set 50 includes a volume of about 1000 $cm^3$ to about 1300 $cm^3$, which can also vary based on diameter and dimensions of shoulders near the periphery edge and near the central hub. With a volume in this range, a density of the density-adjustable composition can be formulated by adding a foaming agent to a base composition to achieve a desired weight amount.

In one aspect, a 0.5 kg plate is cast from a density-adjustable composition having a density in a range of about 0.38 $g/cm^3$ to about 0.48 $g/cm^3$. In a further aspect, a respective density of each of the other weight amounts (e.g., 1.0, 1.5, 2.0, and 2.5 kg) is a respective multiple of the density for the 0.5 kg plate, such that a 2.5 kg plate (having a multiple of 5×) includes a density in a range of about 1.9 $g/cm^3$ to about 2.4 $g/cm^3$. For example, in one aspect, the density of the density-adjustable composition (e.g., semi-flex urethane foam) used to make a 0.5 kg plate having a volume of about 1150 $cm^3$ is about 0.4348 $g/cm^3$. Accordingly, in order to cast a 1.0 kg plate having the same volume of about 1150 $cm^3$ the density of the density-adjustable composition would be doubled to about 0.8696 $g/cm^3$. For example, a lower concentration of a foaming agent could be added to a urethane base composition to formulate a density for the 1.0 kg plate, as compared to the concentration of foaming agent used to formulate a density for the 0.5 kg plate. Applying a similar technique, a density of about 1.3044 $g/cm^3$ could be used for the 1.5 kg plate; about 1.7391 $g/cm^3$ for a 2.0 kg plate; and about 2.1739 for a 2.5 kg plate.

In an alternative aspect, each plate in the set 50 includes a plate diameter in a range of about 43 cm to about 46 cm. For instance, each plate might include a plate diameter of about 45 cm. Although other diameters less than or greater than this range are contemplated in other aspects. In another aspect, each plate in the set 50 includes a plate thickness near the periphery edge and near the central hub of about 4 cm to about 7 cm. For instance, each plate might include a thickness of about 5 cm. But other thicknesses that are less than or greater than this range are contemplated in other aspects. In addition, each plate includes a hole diameter of about 5 cm, which is useful for adding the plates to an Olympic-style weightlifting barbell having sleeves with a 4.9 cm diameter. As such, in one aspect, each plate in the set 50 includes a volume of about 6000 $cm^3$ to about 6500 $cm^3$, which can vary based on diameter and dimensions of shoulders near the periphery edge and near the central hub. In addition, the weight amounts of plates having a volume of about 6000 $cm^3$ to about 6500 $cm^3$ can vary, and in one aspect the weight amounts range from about 2.5 kg to about 10 kg. With a volume in this range, a density of the density-adjustable composition can be formulated by adding a foaming agent to a base composition to achieve a desired weight amount.

In one aspect, a 2.5 kg plate is cast from a density-adjustable composition having a density in a range of about 0.38 $g/cm^3$ to about 0.48 $g/cm^3$. In a further aspect, a respective density of each of the other weight amounts (e.g., 5.0 kg, 7.5 kg, and 10.0 kg) is a respective multiple of the density for the 0.5 kg plate. For example, in one aspect, the density of the density-adjustable composition (e.g., semi-flex urethane foam) used to make a 2.5 kg plate having a volume of about 6250 $cm^3$ is about 0.4 $g/cm^3$. Accordingly, in order to cast a 5.0 kg plate having the same volume of about 6250 $cm^3$, the density of the density-adjustable composition would be doubled to about 0.80 $g/cm^3$. For example, a lower concentration of a foaming agent could be added to a urethane base composition to formulate a density for the 5.0 kg plate, as compared to the concentration of foaming agent used to formulate a density for the 2.5 kg plate. Applying a similar technique, a density of about 1.2 $g/cm^3$ could be used for the 7.5 kg plate; and about 1.6 $g/cm^3$ for a 10.0 kg plate.

In a further aspect, the present invention is directed to a method of manufacturing weightlifting plates by casting a density-adjustable composition. In addition, the method includes calculating a first density of the density-adjustable composition that will be used to cast a first weight having a first weight amount and a common volume (e.g., 1150 $cm^3$). Pursuant to the method, a second density is determined by applying a multiple to the first density, wherein the multiple is calculated by dividing the second weight amount by the first weight amount. For example, a first density of 2.1739 $g/cm^3$ might be calculated for a first weight amount of 2.5 kg in a plate having a volume of 1150 $cm^3$. In order to determine the multiple used to determine the density for a 1.5 weight amount, 1.5 is divided by 2.5 (or 0.6). By multiplying the first density of 2.1739 $g/cm^3$ by the multiple of 0.6, a density of 1.3044 $g/cm^3$ can be calculated for the 1.5 kg plate. These respective densities that are based on multiples can be used to formulate the appropriate density-adjustable composition, which can be used to cast a plate having a particular weight amount.

Figure 3:
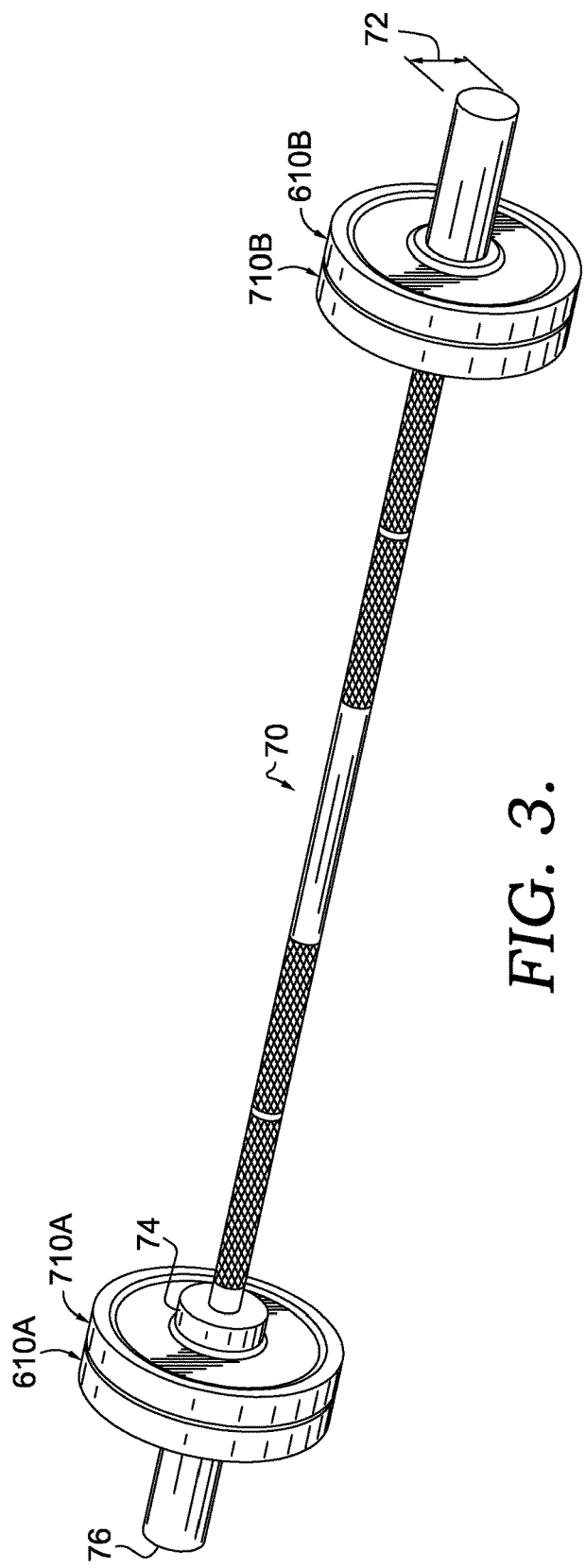
FIG. 3 depicts weightlifting plates loaded on a barbell in accordance with an aspect hereof.

Referring now to FIG. 3, an exemplary depiction is provided of two pairs of plates loaded on a barbell 60. As previously indicated, in one aspect, the barbell 60 includes at least some dimensions consistent with an Olympic-style weightlifting bar, such as those dimensions specified by the IWF. For example, the IWF specifies that a 20 kg barbell includes a sleeve diameter 72 of about 5 cm and a loadable sleeve length of about 41.5 cm, and a 15 kg barbell includes a sleeve diameter of about 5 cm and a loadable sleeve length of about 32 cm. A "loadable sleeve length" includes a distance between the proximal hub 74 of the sleeve, which prevents the weights from sliding to the middle of the barbell, and the distal end 75 of the sleeve. In addition, the barbell might include a distance between sleeves of about 131 cm.

In another aspect, the barbell 60 might include other features that differ from IWF standards, such as a lighter weight amount, which is common in technique bars or junior bars. For example, in one aspect the barbell might include a weight of about 5 kg or about 15 lbs. Often, a lighter weight amount (relative to a 20 kg bar or 15 kg bar) is achieved by shortening the barbell and the loadable sleeve length. For example, the barbell 60 might include sleeves that are about 5 cm in diameter (similar to IWF standards) but that include a reduced loadable sleeve length of about 12.7 cm to about 25.2 cm. With a reduced loadable sleeve length, plate thickness affects how many plates can be loaded on the barbell, such that thinner plates allows more plates to be loaded. However, plates that are too thin typically do not provide a large enough contact surface to create a stable base when loaded on the barbell. In one aspect of the present invention, the common thickness of each plate in the set of plates (e.g., about 3.35 cm) is thin enough to allow a plurality of plates to be loaded on the barbell and is thick enough to provide a large enough contact surface for a stable base when the barbell is resting on a ground surface.

In other aspects of the present invention, the diameter of the plate provides a technique-friendly starting height for a shorter athlete (e.g., youth lifter) learning and executing Olympic-weightlifting movements, such as the snatch and clean-and-jerk. In both the snatch and the clean-and-jerk, a lifter must lift the bar loaded with weights from a platform to an overhead position. For example, when executing the snatch, a lifter moves the bar from the platform to overhead (i.e., arms locked out) in a single movement. Alternatively, the clean-and-jerk includes moving (i.e., cleaning) the bar from the platform to a "racked position" in which the bar is positioned near or across the deltoids and clavicle region. From the racked position, the bar is moved (i.e., jerked) to an overhead position with arms locked. The snatch and the clean-and-jerk are merely examples of lifts that require such movement of the bar, and a variety of other movements may be executed using a bar loaded with weights in which the bar is moved from a platform to an elevated position.

Good technique and focus can benefit a lifter executing weightlifting movements, and often, a lifter's starting position off the ground will affect the performance of the lift. In one aspect, the common height among the set of plates provides a height for shorter lifters (e.g., youth lifters) that is useful for executing lifts from the ground. For example, a diameter of about 22.7 cm positions the barbell approximately mid-shin for an average-height youth lifter. In addition, the consistency of the plate diameter across all weight amounts equates to a consistent starting height regardless of the weight amount loaded on the bar. Absent the present invention, plates having lower weight amounts between 0.5 kg and 2.5 kg often have inconsistent diameters, which contribute to an inconsistent starting position. Thus, when loaded on a barbell, the common diameter and thickness of the plates collectively contribute to a consistent and effective starting bar height (from the ground), efficient use of loadable sleeve length, and a stable base when the loaded bar is resting on the ground or platform.

Although a diameter of about 22.7 cm of about 45 cm is described as a possible diameter for plates in one aspect of the present invention, other diameters are also contemplated. For example a diameter that is smaller than about 22.7 cm might be selected, and a smaller diameter might be useful for shorter athletes or for other purposes. In addition, a diameter that is between about 22.7 cm and about 45 cm might be selected for other purposes. For example, a diameter between about 22.7 cm and about 45 cm might be selected to provide a transitional size between the about 22.7 cm and the about 45 cm. Further, a diameter that is larger than about 45 cm might be selected for other plate sizes. Also, other aspects of the present invention might include thickness that are smaller or larger than than the about 3.35 cm or the about 5.0 cm described in other aspects.

It is not uncommon for the bar to be dropped while a lifter is executing a lift and to strike a floor or platform. For example, a lifter may fail to complete a lift, in which case the lifter drops the bar mid-lift and the bar strikes the floor. In addition, a lifter may drop the weight after a lift has been executed, such as from a racked position or from an overhead position. As such, it can be important that plates loaded on the bar be made of a material that will not damage the platform or the bar. In an aspect of the present invention, a semi-flex urethane foam is used to construct the plates, which can be dropped with a loaded barbell in ordinary use without damaging the plates, the barbell, or the platform.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

The invention claimed is:

1. A system of weightlifting plates comprising:
a first weightlifting plate having a first weight amount and a disc-shaped body including:
   a first surface and an opposing second surface, the first weightlifting plate including a first plate thickness extending between the first surface and the opposing second surface,
   a central bore extending entirely through the first plate thickness and having a first hole diameter, and
   a circular periphery edge forming a first plate diameter; and
a second weightlifting plate having a second weight amount and a disc-shaped body including:
   a third surface and an opposing fourth surface, the second weightlifting plate including a second plate thickness extending between the third surface and the opposing fourth surface, the first plate thickness being the same as the second thickness;
   a central bore extending entirely through the second plate thickness and having a second hole diameter, which is the same as the first hole diameter; and
   a circular periphery edge forming a second plate diameter, which is the same as the first plate diameter, such that the first weightlifting plate and the second weightlifting plate have the same volume, wherein the first weight amount is greater than the second weight amount, wherein the first weightlifting plate and the second weightlifting plate are constructed of a density-adjustable, base composition combined with different respective amounts of a foaming agent, and wherein the first weight amount and the second weight amount are in a range of about 0.5 kg to about 2.5 kg.

2. The system of claim 1, wherein the first plate diameter and the second plate diameter are about 22.7 cm.

3. The system of claim 2, wherein the first plate thickness and the second plate thickness are about 3.35 cm.

4. The system of claim 1, wherein the first weight amount is at least 0.5 kg greater than the second weight amount.

5. The system of claim 1, wherein the first weight amount is about 2.5 kg and the second weight amount is about 0.5 kg, and wherein the system further comprises, a third weightlifting plate having a third weight amount and a disc-shaped body including:
- a fifth surface and an opposing sixth surface, the third weightlifting plate including a third plate thickness extending between the fifth surface and the sixth surface, the third plate thickness being the same as the first thickness and second thickness;
- a central through bore having a third hole diameter, which is the same as the first hole diameter and the second hole diameter; and
- a circular periphery edge forming a third plate diameter, which is the same as the first plate diameter, wherein the first weight amount is greater than the third weight amount and the third weight amount is greater than the second weight amount.

6. The system of claim 1, wherein the same volume is in a range of about 1000 cm$^3$ to about 1300 cm$^3$.

7. The system of claim 1, wherein the same volume is in a range of about 6000 cm$^3$ to about 6500 cm$^3$.

8. A weightlifting system comprising:
- a barbell having loadable sleeves, which include a sleeve diameter of about 5.0 cm and a loadable sleeve length in a range of about 12.7 cm to about 25.2 cm; and
- a first pair of weightlifting plates, wherein each plate in the first pair of weightlifting plates includes a first common weight amount and a disc-shaped body including:
- a first surface and an opposing second surface;
- a plate thickness of about 3.35 cm extending between the first surface and the opposing second surface;
- a central bore extending entirely through the plate thickness and having a hole diameter of about 5.0 cm, wherein the loadable sleeves are insertable through the central bore; and
- a circular periphery edge forming a first plate diameter of about 22.7 cm; and
- a second pair of weightlifting plates, wherein each plate in the second pair of weightlifting plates includes a second common weight amount different from the first common weight amount and a disc-shaped body including:
- a third surface and an opposing fourth surface, the plate thickness of about 3.35 cm extending between the third surface and the opposing fourth surface;
- a central bore extending entirely through the plate thickness and having a hole diameter of about 5.0 cm, wherein the loadable sleeves are insertable through the central bore, and
- a circular periphery edge forming the plate diameter of about 22.7 cm such that each plate in the first pair and each plate in the second pair all have the same volume, wherein each plate in the first pair and each plate in the second pair is constructed of a base material comprising semi-flex urethane foam, and wherein each plate in the first pair is constructed with a first concentration of a foaming agent and each plate in the second pair is constructed with a second concentration of the foaming agent, which is different than the first concentration and which results in the second common weight amount being different from the first common weight amount.

9. The weightlifting system of claim 8, wherein the first common weight amount is in a range of about 0.5 kg to about 1.5 kg and wherein the second common weight amount is in a range of about 1.5 kg to about 2.5 kg.

* * * * *